3,253,112
TUBE WELDING
Donald P. Worden, Racine, Wis., assignor to Walker Manufacturing Company, Racine, Wis., a corporation of Delaware
Filed July 5, 1963, Ser. No. 292,959
11 Claims. (Cl. 219—8.5)

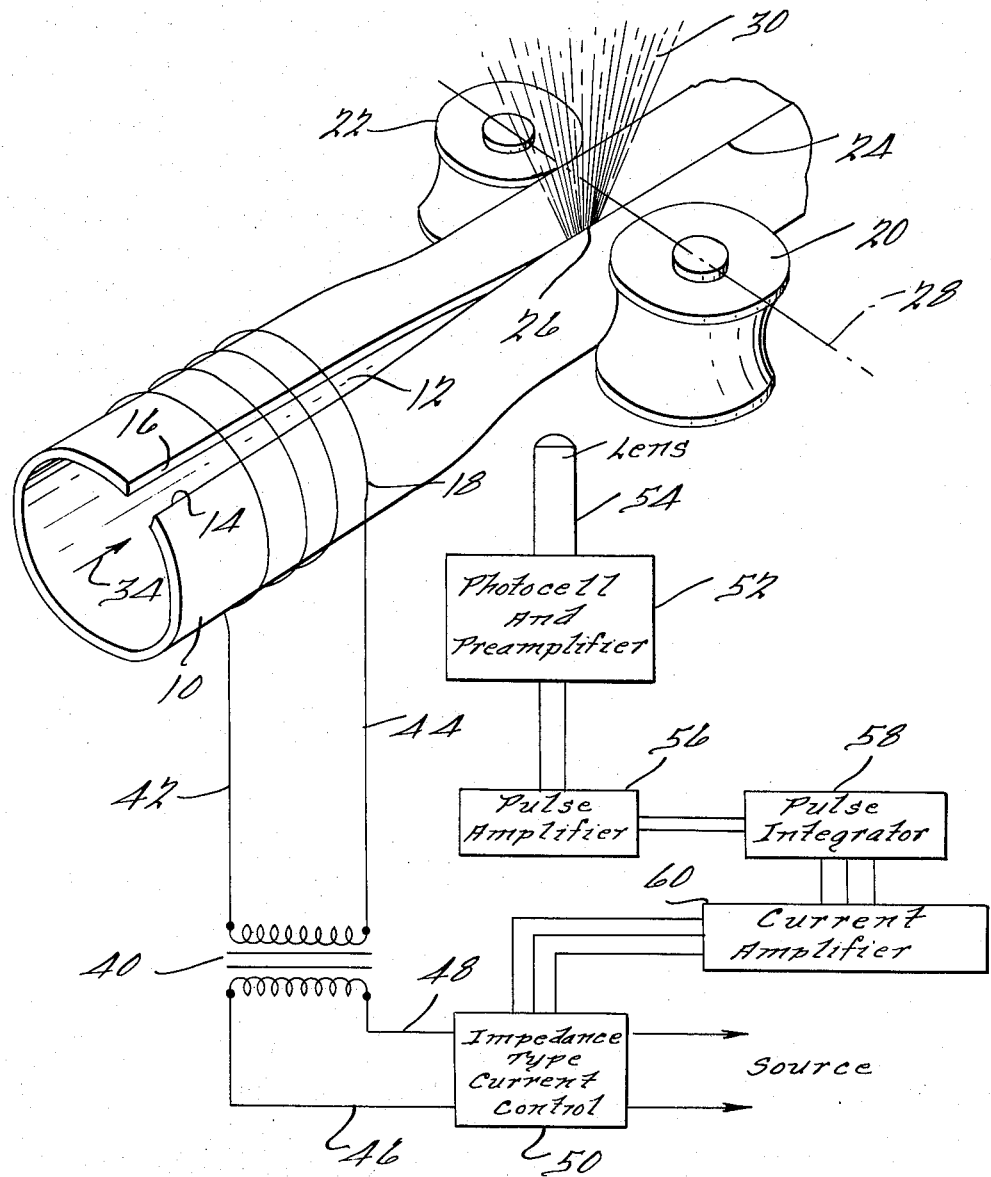

This invention relates to tube welding apparatus and methods, and more particularly to apparatus for and a method of controlling weld heat.

In tube welding operations to which the present invention relates sheet material is roll formed into tubular configuration with opposite edges in closely spaced relationship for butt welding. Heating means are provided to heat the edges of the material to the melting point and squeeze rolls are provided to force the heated edges together to weld the sheet material in tubular form.

The strength of the weld is dependent upon the attainment of a uniform continuous molten condition along the edges of the material. It is desirable to maintain the molten condition of the edges at or close to a predetermined standard condition in order to maintain uniformity. Several constantly changing variables affect the attainment of a standard condition. For example, the "chemistry" of the material varies, not only from piece to piece, but also from section to section of the same piece of material. Other exemplary variable factors include welding current and welding pressures exerted by the squeeze rolls.

The primary object of the invention is to provide new and improved means for controlling tube welding operations in response to changes in condition of any of the many variables affecting weld quality.

Another object is to provide a method of controlling tube welding operations within accurate limits of reliability, uniformity, and repeatability at minimum cost.

The invention is illustratively shown on the accompanying drawing which is a schematic diagram of control apparatus embodying the inventive principles.

Referring now to the drawing, a portion of a length of continuous sheet metal material 10 is shown in a rolled tubular condition having a gap 12 between opposite edges 14, 16. An electrical induction heating unit 18, or the like, is provided to heat the edges to a weldable condition prior to passage through squeeze rolls 20, 22 which move the edges 14, 16 into abutting engagement and close the gap 12 to form a welded seam 24. The point of initial contact between the edges is shown generally at 26 in a position slightly in front of the squeeze roll centerline 28. It is to be understood that the aforedescribed apparatus is intended to be illustrative of any of the various conventional tube welding apparatus associated with a rolling mill, or the like, which forms sheet material to the general configuration illustrated.

Under certain operating conditions during a welding operation, a fan of sparks 30 emanates from the weld point 26 and extends upwardly and fans outwardly therefrom. The fan generally has an inclination opposite to the direction of movement of the tube through the squeeze rolls, as indicated by the arrow 34. The intensity of the sparking effect appears to vary directly in accordance with the molten condition of the edges of the tube at the welding point 26.

I have discovered that extremely reliable and economical tube welding may be obtained on conventional tube mill forming and welding equipment of varying types by maintaining a particular sparking effect. It has been my experience that the physical characteristics of the fan of sparks provide a reliable indication of weld quality and may be advantageously utilized to determine the degree of adjustment of the welding variables necessary to attain a predetermined optimum welding condition. More particularly, I have found that the power input to the heating unit may be adjusted until the fan of sparks has certain dimensional characteristics and that, when the fan of sparks has those certain dimensional characteristics, the quality of the weld will be uniformly good, the apparatus will produce optimum results, and the power cost will be minimized. I have found that a fan of sparks having a height, measured upwardly and outwardly from the weld point, of approximately between 1 inch and 5 inches is generally indicative of a molten condition at the weld which will result in uniformly good welds with a minimum of power input. The preferable range of sparking at which optimum results are attained appears to be between 1 inch and 2 inches.

The sparking effect appears to represent excess energy above and beyond the amount of energy which is needed to just bring the edges of the weld to a molten condition. Although a good weld might be obtained at any given time when the edges have just reached the molten condition, a continuous welding operation at an energy level corresponding thereto would invariably result in some good welds and in some bad welds which cannot be tolerated. On the other hand, the sparking effect can be greatly increased to insure that all portions of the edges reach the molten condition. However, such a procedure is extremely wasteful and greatly increases manufacturing costs. Thus, it is desirable to apply an excess energy input beyond a level which would be just sufficient to bring the edges to a molten condition under most circumstances and to limit the excess energy input to a level at which weld uniformity is assured.

An illustrative control system, incorporating the aforedisclosed method of control is shown on the drawing and comprises a transformer 40 connected to the induction heating winding 18 by lines 42, 44 and to a source through lines 46, 48. Current control means 50, in the form of a conventional impedance type control, for example, is connected in the input lines. The impedance control is instantaneously automatically operable in response to changes in the sparking effect by means of a control circuit energized by a conventional photocell-amplifier unit 52. A lens 54 may be provided to facilitate detection of changes in the fan effect. Signals generated by the photocell-amplifier are transmitted through a pulse amplifier 56, a pulse integrator 58, and a current amplifier 60 to the impedance control 50 in a conventional manner. It will be readily understood that any other control means electrical, mechanical or hydraulic, or combinations thereof, incorporating the principles of the disclosed method may be equally well utilized.

When the physical characteristics of the sparking effect vary from a predetermined standard such as represented by, for example, a 2 inch fan, the current applied to the induction heating coil 18 is correspondingly changed. If the sparking effect increases, indicating an increase in excess energy input, the impedance control is actuated to reduce the current in lines 46, 48 and consequently in lines 42, 44. Conversely, if the sparking effect decreases indicating a decrease in excess energy, the impedance control is actuated through the control circuitry to increase the current in lines 46, 48 and in lines 42, 44.

It is foreseen that the aforedisclosed method may be variously applied and that the details of construction of the illustrative apparatus may be varied and changed without departing from the underlying inventive principles. Therefore, it is intended that the appended claims be given a construction resulting in a scope of patent coverage commensurate with the inventive disclosure.

The invention claimed is:

1. The method of controlling continuous-type tube welding operations comprising the step of maintaining the energy input at the weld point at a level sufficient to maintain a predetermined standard sparking effect at the weld to insure a continuous uniform weld requiring a minimum power input.

2. The method of controlling continuous-type tube welding operations comprising the steps of:
   (1) applying current to an induction heating element until a predetermined sparking effect at the weld is attained;
   (2) continuously measuring the sparking effect; and
   (3) changing the current with changes in the sparking effect to maintain the predetermined sparking effect.

3. The method of controlling a continuous type welding operation comprising the step of maintaining energy input at the weld point at a level sufficient to maintain a sparking effect at the weld point of between 1 inch and 5 inches.

4. The method of controlling a continuous tube welding operation comprising the step of maintaining heat input at the weld at a level sufficient to maintain a sparking effect at the weld point of between 1 inch and 2 inches.

5. The method of controlling a continuous tube welding operation comprising the steps of continuously measuring the sparking effect at the weld point, and continuously automatically adjusting the welding heat applied to the tubing in accordance with the measurements of sparking effect to maintain a predetermined sparking effect.

6. Apparatus for controlling a tube welding operation comprising sensing means for determining the amount of sparking at the weld point, and control means responsive to the amount of sparking as determined by said sensing means to change the sparking effect and maintain a predetermined sparking effect.

7. The apparatus as defined in claim 6 and wherein said sensing means comprises a photocell and control circuitry operable by said photocell to actuate said control means.

8. The apparatus as defined in claim 6 and wherein said control means comprises a current controlling device controlling current applied to an induction heating coil.

9. The method of controlling a welding operation during welding of edges of metal sections comprising the steps of applying current to a heating element associated with the metal sections until a predetermined sparking effect at the weld is attained, measuring the sparking effect, and changing the current when changes in the sparking effect occur to maintain the predetermined sparking effect.

10. The method of welding edge portions of metallic sheet material comprising the steps of heating the edge portions, bringing the edge portions together to form a weld, causing a sparking effect at the weld, and adjusting the energy input at the weld to obtain a predetermined optimum sparking effect.

11. The method of welding edge portions of metallic sheet material comprising the steps of heating the edge portions, bringing the edge portions together to form a weld, causing a sparking effect at the weld, adjusting the energy input at the weld to obtain a predetermined optimum sparking effect, and thereafter maintaining the predetermined optimum sparking effect by adjusting the energy input at the weld.

References Cited by the Examiner

UNITED STATES PATENTS

| | | | |
|---|---|---|---|
| 1,937,945 | 12/1933 | Correll | 219—9.5 |
| 2,222,977 | 11/1940 | Jones | 219—9.5 |

ANTHONY BARTIS, *Acting Primary Examiner.*

RICHARD M. WOOD, *Examiner.*